Oct. 22, 1957  G. L. NORD ET AL  2,810,872

METALLIC RECTIFIER MOUNTING STRUCTURE

Filed Oct. 2, 1956

INVENTORS
Gordon L. Nord
BY Arthur W. Mueller

ATT'YS

United States Patent Office 2,810,872
Patented Oct. 22, 1957

2,810,872
METALLIC RECTIFIER MOUNTING STRUCTURE

Gordon L. Nord, Cincinnati, and Arthur W. Mueller, Newtown, Ohio, assignors to Schauer Manufacturing Corporation, Cincinnati, Ohio, a corporation of Ohio Application October 2, 1956, Serial No. 613,449

3 Claims. (Cl. 317—234)

This invention relates to metallic rectifiers that are presently used in large quantities in electric conversion systems, and is particularly directed to an improved mounting structure for these metallic rectifiers.

An object of the invention is to provide a metallic rectifier mounting structure that conserves parts and materials and is well adapted to automation in its manufacture.

Other objects of the invention are to provide a mounting structure for a stack of metallic rectifying discs and terminals which produces an effective and uniform clamping pressure for all rectifiers so constructed; to provide a mounting structure which permits the connecting fingers of plural terminals to project from a side of the structure that is unobstructed by mounting parts; and to provide a metallic rectifier mounting structure that has a fixed, rugged construction which will withstand vibrations and sudden jolts.

These and other objects of the invention are attained by the structure described herein and exemplified in the accompanying drawing; in which.

Figure 2:
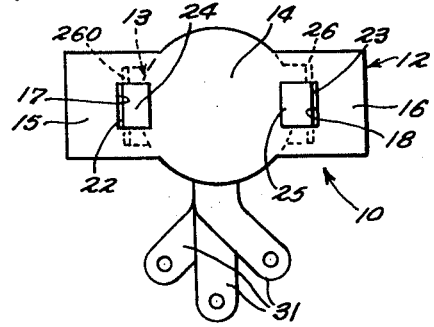
Fig. 2 is a bottom plan view of the mounting.
Figure 4:
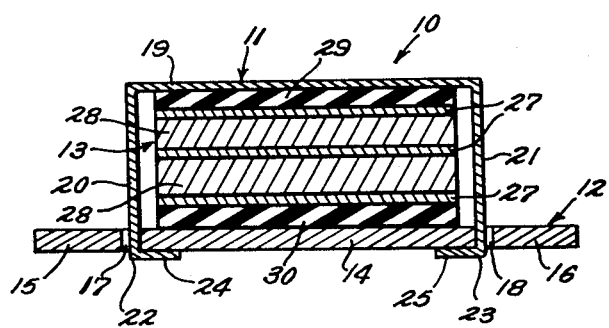
Fig. 4 is an enlarged section taken on line 4—4 of Fig. 1.

Referring to the drawing the metallic rectifier mounting structure 10 comprising a U-shaped bracket 11 preferably formed from a metallic stamping and fastened to a metallic base plate 12 for securely mounting between them a stack 13 of alternating terminals and rectifier discs. As best shown in Figs. 2 and 4 the base plate has a flat and generally circular body portion 14 and integral and relatively wide ears 15 and 16 extending from opposite sides of the said body portion 14 in the same plane therewith. Slots 17 and 18 are formed through the ears 15 and 16, respectively, and are located just outside the circular contour of the central body portion 14 of the plate; it being noted with reference to Fig. 2 that the slots extend laterally across the ears and are centered and substantially foreshortened with respect to the width dimension of their respective ears.

The U-shaped bracket 11 has a generally circular body portion 19 corresponding to and located directly above the body portion 14 of the base plate, said body portion 19 having integral legs 20 and 21 depending downwardly from opposite sides thereof and at right angles thereto. Each leg 20 and 21 terminates in a relatively narrow ear 22 and 23, respectively, that are insertable through slots 17 and 18, respectively, in the base plate, the free ends of said ears being turned inwardly at 24 and 25, respectively (Figs. 2 and 4), against the undersurface of the plate 12 to permanently clinch or lock the bracket to the plate. It will be noted with particular reference to Fig. 3 that the narrow ear 23 on the end of the relatively wider leg 21 forms a shoulder 26 on the terminal end of the leg which is firmly engaged against the upper face of the base plate 12 when the free end of said ear is clinched against the undersurface of the plate. A like shoulder 260 is formed on the terminal end of the leg 20 by the narrow ear 22.

Figure 1:
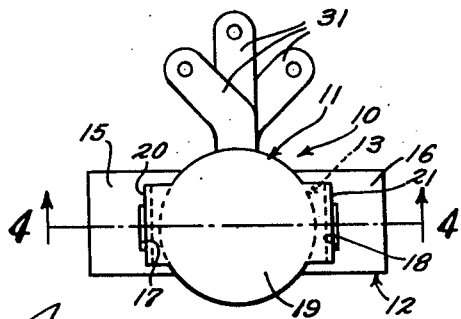
Fig. 1 is a top plan view of the metallic rectifier mounting.
Figure 3:
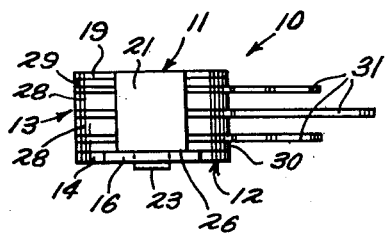
Fig. 3 is a side elevational view of the mounting as shown in Figs. 1 and 2.

The stack 13 consists of alternate terminals 27 and rectifier discs 28 positioned between confronting faces of the central body portions 19 and 14 on the bracket 11 and base plate 12, respectively, the stack being electrically insulated therefrom by fiber discs 29 and 30 located at the top, and bottom, respectively, of the stack. As shown in Figs. 1–3 the connector fingers 31 integral with the terminals 27 project from a common side of the structure and are unobstructed by either the bracket or the base plate therefor.

Figure 5:
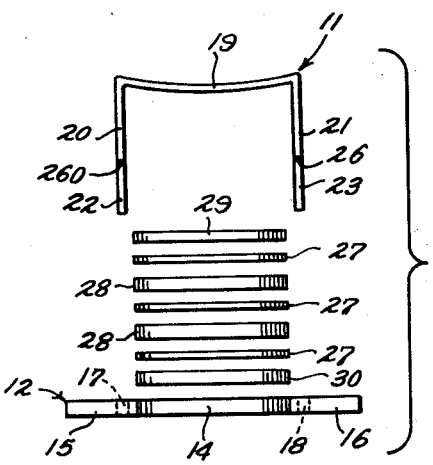
Fig. 5 is an exploded view of the rectifier parts shown in front elevation.

The manner in which the device is manufactured is best illustrated in Fig. 5 wherein it will be seen that the generally circular body portion 19 of the bracket 11 is dished inwardly toward the position of the base plate and that the ears 22 and 23 are in the plane of the legs 20 and 21, respectively when the structure is in an intermediate stage of its manufacture. In adapting the parts to automation brackets 11 (Fig. 5) are continuously fed to, and inserted upside down in wells formed in the traveling links of an endless conveyor chain. As these brackets are passed from one station to another insulator discs 29, terminals 27 and rectifier discs 28 are loaded into the brackets in proper sequence. The base plate 12 is the last part to be mechanically fed to and placed upon the brackets, suitable assembly pressure being applied to the plate before the ears are clinched to the underside of said plate. The assembly pressure exerted upon the base plate 12 tends to flatten the circular body portion 19 of the bracket 11 which places it under tension; the heightwise dimension of the legs determining the maximum pressure that may be placed on the parts by reason of the fact that shoulders 26 and 260 on the legs 20 and 21, respectively, contact the base plate and prevent excess pressure upon the stack. After assembly the mounting structures are preferably immersed in a resinous insulating material and allowed to dry. In use the opposed ears 15 and 16 on the structures cooperate with complementary mounting means on the cases, cabinets or other base or frame members of electrical units requiring rectifiers in their circuits, a showing of such cooperative mounting means being omitted from the drawing and specification because several other desirable mountings will readily occur to those skilled in the art.

The advantages of the invention will be apparent from the foregoing description. Effective clamping pressure is placed upon the stack of alternating terminals and rectifiers to preclude their accidental displacement from the structure whilst excessive pressure on the stack is precluded by the overall height of the legs 18 and 19 and the engagement of their respective shoulders 26 and 260 with the base plate 12. The desired clamping pressure for the stack is also a fixed and resilient one in view of the fact that the dish shaped central portion 19 of the bracket 11 is deformed toward flattened position during assembly of the structure and remains under resilient tension during the life of the structure. It will also be noted that the structure has a minimum number of relatively simple parts which may readily be handled by automatic machinery and that the assembled structure has a fixed rugged construction that cannot be loosened by vibratory forces.

While the invention has been particularly described in connection with metallic rectifiers it is by no means limited to this particular use, it being thought that the mounting structure may be used for other semi-conductors and many other electrical rectifying devices.

What is claimed is:

1. A metallic rectifier mounting structure comprising a metallic U-shaped bracket and a base plate, said base plate having a central body portion and opposed ears projecting from the body portion and each ear having a slot formed therethrough adjacent the body portion, said bracket including a dished central portion, and legs depending from opposed sides of the said central portion, the terminal ends of the legs being laterally reduced and each terminal end passing through a slot in the base plate, a stack of alternating terminals and metallic rectifiers disposed between and electrically insulated from the central portions of the bracket and base plate and spaced from the legs of the bracket, said central portion of the bracket being held in flattened condition against the stack by the legs of the bracket upon clinching of the terminal ends against the underside of the base plate.

2. A metallic rectifier mounting structure comprising a metallic U-shaped bracket and a base plate, said base plate having a central body portion and opposed ears projecting from the body portion and each ear having a slot formed therethrough adjacent the body portion, said bracket including a dished central portion, and legs depending from opposed sides of the said central portion, a narrow integral ear on the terminal ends of each leg extending through a slot in the base and having its free terminal end clinched against the underside of the base plate, a shoulder formed on the leg by the ear and in contact with the upper face of the base plate, a stack of alternating terminals and metallic rectifiers disposed between and electrically insulated from the central portions of the bracket and the base plate and spaced from the legs of the bracket, said central portion of the bracket being held in resilient flattened condition against the stack under predetermined tension by the height of the legs and the engagement of the shoulders of the legs on the base plate.

3. As an article of manufacture a flat base plate stamped from non-flexible sheet metal and having a central body portion and a pair of opposed ears projecting from the body portion and each having a lateral slot formed therethrough adjacent the said body portion, a U-shaped bracket stamped from flexible sheet metal and having a central body portion dished in the direction of the base plate, a pair of legs depending from opposite sides of the central portion of the bracket and each having a reduced end portion projecting through a slot and having its terminal clinched over against the underside of the base plate, a stack of alternating terminals and metallic rectifiers disposed between and electrically insulated from the central portions of the bracket and of the base plate, the height of the stack and the height of the legs being substantially the same to thereby flatten the central body portion of the bracket upon assembly of the article to thereby place the said body portion in cooperative tensioned stack clamping condition with the central portion of the base plate.

References Cited in the file of this patent

UNITED STATES PATENTS

| | | |
|---|---|---|
| 2,665,399 | Lingel | Jan. 5, 1954 |
| 2,740,075 | Walker et al. | Mar. 27, 1956 |